(12) United States Patent
Sirotkin et al.

(10) Patent No.: US 9,949,166 B2
(45) Date of Patent: Apr. 17, 2018

(54) EXTENDED ACCESS BARRING (EAB) SIGNALING FOR A CORE NETWORK (CN) AND NODE

(75) Inventors: Alexander Sirotkin, Petach Tikva (IL); Puneet K. Jain, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1510 days.

(21) Appl. No.: 13/591,652

(22) Filed: Aug. 22, 2012

(65) Prior Publication Data

US 2013/0215742 A1 Aug. 22, 2013

Related U.S. Application Data

(60) Provisional application No. 61/589,774, filed on Jan. 23, 2012.

(51) Int. Cl.
*H04W 28/02* (2009.01)
*H04W 48/06* (2009.01)
*H04W 48/10* (2009.01)
*H04W 4/00* (2018.01)

(52) U.S. Cl.
CPC ....... *H04W 28/0247* (2013.01); *H04W 48/06* (2013.01); *H04W 4/005* (2013.01); *H04W 48/10* (2013.01)

(58) Field of Classification Search
CPC . H04W 28/0247; H04W 48/06; H04W 48/10; H04W 4/005
See application file for complete search history.

(56) References Cited

U.S. PATENT DOCUMENTS

| 2009/0116385 | A1* | 5/2009 | Ueda | H04W 48/06 370/230 |
|---|---|---|---|---|
| 2011/0058480 | A1 | 3/2011 | Dahlén | |
| 2013/0045706 | A1* | 2/2013 | Hsu | 455/404.1 |
| 2014/0056134 | A1* | 2/2014 | Koskinen | H04W 48/06 370/230 |
| 2014/0128029 | A1* | 5/2014 | Fong | H04W 48/12 455/411 |
| 2014/0171096 | A1* | 6/2014 | Hwang et al. | 455/452.1 |

FOREIGN PATENT DOCUMENTS

| EP | 1912461 A2 | 4/2008 |
|---|---|---|
| EP | 2009933 A | 12/2008 |
| JP | 2009-005013 A | 6/2007 |

(Continued)

OTHER PUBLICATIONS

3GPP TS 36.413 V10.2.0 (Jun. 2011), pp. 137,142,192,215.*

(Continued)

*Primary Examiner* — Jeffrey M Rutkowski
*Assistant Examiner* — Mandish Randhawa
(74) *Attorney, Agent, or Firm* — Thorpe North & Western

(57) ABSTRACT

Technology for core network signaling of an extended access barring (EAB) action between a node (e.g., an eNodeB) and a core network (CN) entity (e.g., a mobility management entity (MME)) is disclosed. One method can include a node receiving from a core network entity an EAB action in an overload start message. The node can transmit EAB configuration information from the node to a wireless device based on the received EAB action.

23 Claims, 9 Drawing Sheets

(56) References Cited

FOREIGN PATENT DOCUMENTS

KR  10-2010-0060326 A  6/2010
WO       0103463 A1   1/2001

OTHER PUBLICATIONS

Samsung, 3GPP RAN WG2 #74, May 9-13, 2011.*
Huawei,3GPP TSG-RAN WG3 Meeting #73, EAB Impacts on RAN3, Aug. 22-26, 2011.*
Rapporteur, 3GPP TSG-RAN WG@ meeting #76, [75b#31]—Joint: SIB update mechanism for EAB, Nov. 14-18, 2011.*
LG Electronics Inc, "Further Discussion on EAB", Discussion and Decision, 3GPP TSG-RAN WG2 R2-113339, May 2011, Meeting 74, Agenda 4.3.1, pp. 5, Barcelona, Spain.
Search Report for European application 13740608.8 dated Sep. 30, 2015, 6 pages.
Huawei, "EAB Impacts on RAN3", 3GPP TSG-RAN WG3 R3-112371, Aug. 2011, 3pages, Meeting 73, Agenda 21, Athens, Greece.
Intel Corp, "EAB support for L TE", 3GPP TSG-RAN WG3 3-112924, Nov. 2011, 4 pages, Meeting 74, San Francisco, USA.

* cited by examiner

```
OverloadAction ::= ENUMERATED {
    reject-non-emergency-mo-dt,
    reject-rrc-cr-signalling,
    permit-emergency-sessions-and-mobile-terminated-services-only,
    ...,
    permit-high-priority-sessions-and-mobile-terminated-services-only,
    reject-delay-tolerant-access
}

EABAction ::= ENUMERATED {
    eab,
    eab-not-in-hplmn,
    eab-not-in-hplmn-not-in-country-preferred-plmn,
}

OverloadStart ::= SEQUENCE {
protocolIEs          ProtocolIE-Container        { {OverloadStartIEs} },
...
}

OverloadStartIEs S1AP-PROTOCOL-IES ::= {
{ ID id-OverloadResponse      CRITICALITY reject  TYPE OverloadResponse           PRESENCE mandatory}|
{ ID id-GUMMEIList            CRITICALITY ignore  TYPE GUMMEIList                 PRESENCE optional}|
{ ID id-TrafficLoadReductionIndication    CRITICALITY ignore  TYPE TrafficLoadReductionIndication
PRESENCE optional}, |
{ ID id-eabAction             CRITICALITY ignore  TYPE EABAction  PRESENCE optional},

EXTENDED ACCESS BARRING (EAB) SIGNALING FOR A CORE NETWORK (CN) AND NODE

RELATED APPLICATIONS

This application claims the benefit of and hereby incorporates by reference U.S. Provisional Patent Application Ser. No. 61/589,774, filed Jan. 23, 2012.

BACKGROUND

Wireless mobile communication technology uses various standards and protocols to transmit data between a node (e.g., a transmission station or transceiver station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use OFDM modulation for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of evolved universal terrestrial radio access network (E-UTRAN) Node Bs (also commonly denoted as evolved Node Bs, enhanced Node Bs, eNodeBs, or eNBs) and radio network controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node. Furthermore, the nodes can be connected to a mobility management entity (MME) located in the core network by means of the S1 interface.

Another technology for mobile communication is a universal mobile telecommunications system (UMTS), which is a 3GPP mobile cellular technology for networks using code division multiple access (CDMA). In UMTS, the node can be a combination of Node Bs (also commonly denoted as NodeBs or NBs) and radio network controllers (RNCs), which communicates with the wireless device, known as the UE. UMTS can specify a network system, covering the UMTS terrestrial radio access network (UTRAN), a core network (including a mobile application part (MAP)), and an authentication of users via subscriber identity module (SIM) cards. The RNCs can be connected to the core network by means of the Iu interface.

Under certain circumstances, known as access barring, a node can prevent or restrict wireless device users from making access attempts, which can include emergency call attempts, or responding to pages in specified areas of a public land mobile network (PLMN). Such situations can include states of emergency or failure of one or more co-located PLMNs. Access class barring (ACB) can be used to prevent wireless devices from making access attempts to the node in LTE systems and UMTS.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 illustrates a overload start message in a long term evolution (LTE) system including extended access barring (EAB) action in accordance with an example;

Figure 1:
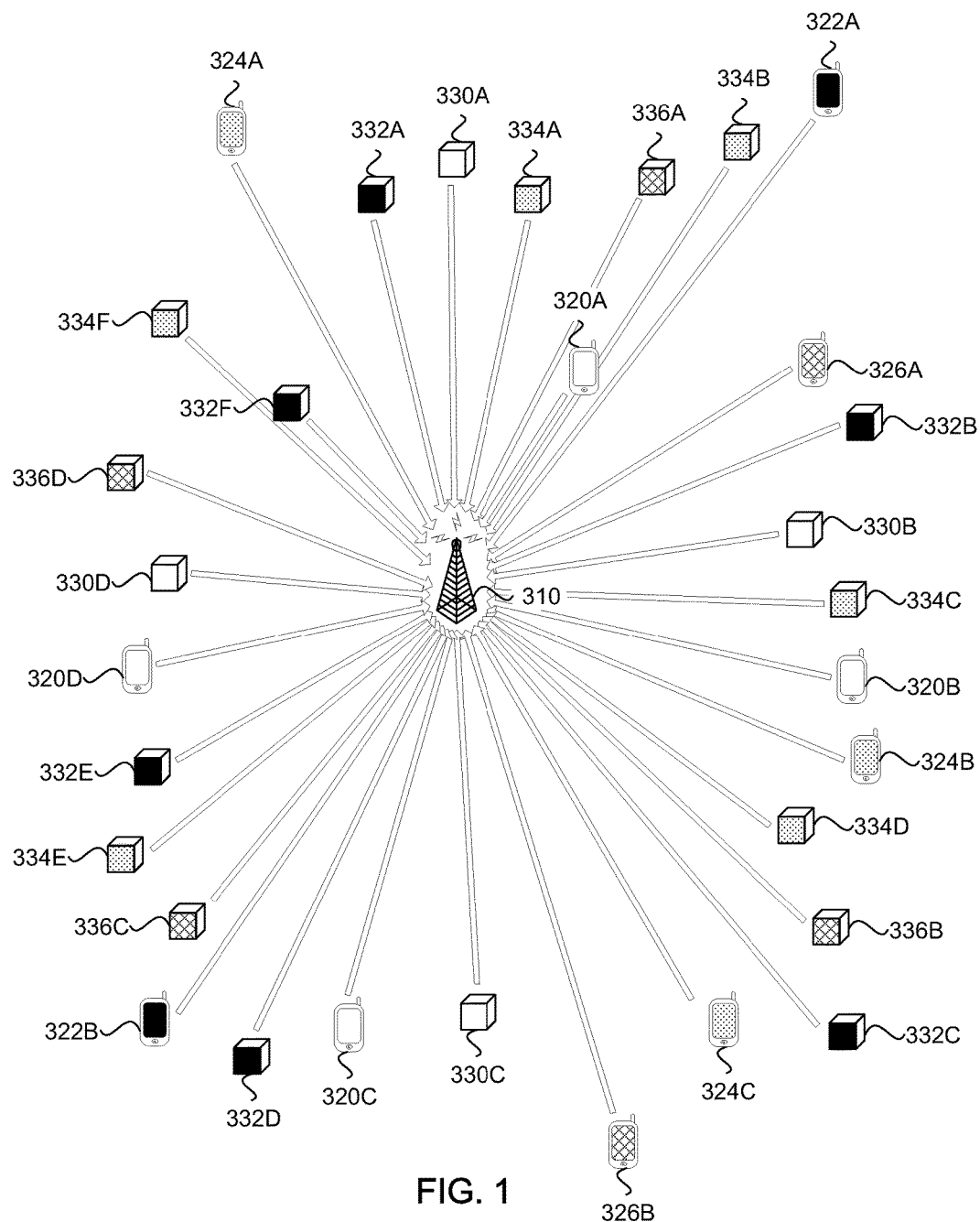
FIG. 1 illustrates a block diagram of a plurality of wireless devices transmitting a random access channel (RACH) to a node in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A large number of machine type communication (MTC) devices and/or machine-to-machine (M2M) devices may access a radio access network (RAN). As used herein, MTC and M2M may be used interchangeably. The MTC devices may overload the RAN and a core network (CN) supporting the RAN. Overload control and protection mechanisms may be provided in a network to reduce overload conditions due to a large number of MTC devices that the RAN and core network may support.

Access barring, such as extended access barring (EAB), can provide overload control and protection of the network, including the RAN and the CN. Access barring can allow the network to bar the access of low priority and/or delay tolerant MTC devices or services when the network (e.g., the RAN or the core network) and/or a network component (e.g., a node) is overloaded. As used herein, the term "node" can refer to a transceiver configured to communicate a downlink signal to a plurality of wireless devices, and receive an uplink signal from a plurality of wireless devices. For instance, a node may include an eNB, a base station, or another standardized or non-standardized transceiver configured to communicate a downlink or uplink signal to the plurality of wireless devices. As used herein, delay tolerant and low priority may be used interchangeably. Access barring, such as access class barring (ACB) and extended access barring (EAB), allows a node to broadcast messages which can prevent or restrict wireless device users from making access attempts at the node. Broadcast messages can be available on a cell by cell basis indicating the class(es) or categories of subscribers barred from network access. Access barring allows a network operator to prevent overload of the radio access network and core network.

In an example, wireless devices can be members of one out of ten randomly allocated mobile populations, defined as access classes 0 to 9. A population number can be stored in a subscriber identity module or subscriber identification module (SIM) or universal subscriber identity module (USIM). In addition, wireless devices may be members of one or more special categories (e.g., access classes 11 to 15), also held in the SIM/USIM. The special categories can be allocated to specific high priority users. Class 15 can be allocated to public land mobile networks (PLMNs) staff, class 14 can be allocated to emergency services, class 13 can be allocated to public utilities (e.g., water/gas suppliers), class 12 can be allocated to security services, and class 11 can be allocated for PLMN use.

In ACB, if the wireless device is a member of at least one access class (AC) which corresponds to permitted classes as signaled over an air interface, and the access class is applicable in the serving network, access attempts may be allowed. Classes 0-9 can be allowed in home public land mobile networks (PLMNs) and visited PLMNs (VPLMNs). Classes 11 and 15 can be allowed in a home PLMN (HPLMN) if an equivalent home PLMN (EHPLMN) list is not present, or any EHPLMN. Classes 12, 13, or 14 can be allowed in the HPLMN and VPLMNs of a home country. A home country can be the country of the mobile country code (MCC) part of the international mobile subscriber identity (IMSI). Any number of these classes may be barred at any one time.

EAB can provide additional access barring over ACB. Extended access barring (EAB) can include a mechanism for the operator(s) (e.g., network operators) to control mobile originating access attempts from wireless devices configured for EAB in order to prevent overload of the access network and/or the core network. In congestion situations, the operator can restrict access from wireless devices configured for EAB while permitting access from other wireless devices. Wireless devices configured for EAB can be considered more tolerant to access restrictions than other wireless devices. The network can broadcast information to provide EAB control for wireless devices in a specific area when an operator or some automated process determines to apply EAB, such as an overload condition or other triggering event.

A wireless device configured for EAB can be categorized based on the wireless device's roaming category (a wireless device's relationship to the PLMN, which supports a node). The node in the RAN of the PLMN can use a broadcast control channel (BCCH) to broadcast EAB information to wireless devices. The EAB information on the BCCH can indicate which category of wireless devices configured with EAB can apply EAB. Access barring information (e.g. the EAB information) can be transmitted in the BCCH using a system information block (SIB) or a master information block (MIB). Wireless devices configured with EAB can check their categories (e.g., category A, B, or C, discussed below) in order to determine whether or not to apply EAB. In an example, two bits can be used to indicate the roaming category (category A, B, or C) on which EAB parameters are applied to the wireless device.

EAB can bar different types or categories of wireless devices than ACB, and/or EAB can provide different barring mechanisms than ACB. EAB may be configured for delay tolerant access wireless devices, such as MTC wireless devices, instead of all wireless devices in ACB. Wireless devices configured for EAB can be more tolerant to access restrictions (e.g., delay tolerant) than other wireless devices. EAB can be used to handle roamers, or wireless devices operating outside a HPLMN and/or EHPLMN. For a wireless device configured with EAB, EAB may take precedence over ACB.

In an example, the EAB parameters can include a barring bitmap where each bit corresponds to an access class (AC). A total of 10 bits can be used for AC 0-9. For example, when a particular bit in the barring bitmap is set to "1" (e.g., a logical or digital one or a set flag), the corresponding AC can be barred. Otherwise, the particular bit in the barring bitmap is set to "0" (e.g., a logical or digital zero or a non-set flag), the corresponding AC may not be barred.

MTC devices can be numerous in a cell or the RAN. The large number of MTC devices may be similarly configured and programmed to respond at a certain time. For instance, an MTC device may be a utility sensor, such as a gas sensor, that is configured to relay data to an eNB. Hundreds or thousands of these sensors may each attempt to connect to an LTE network within a same cell. The MTC devices can result in a large influx of connection attempts in a relatively short period of time. The influx can be referred to as "bursty access" to the node. With MTC usage, the large number of MTC wireless devices which result in bursty access to the node can overload the node and/or the network.

In an overload condition, the random access channel (RACH) may be overloaded, which may block access of a normal priority wireless device (non-delay tolerant access wireless device, non-low priority access wireless device, or high priority wireless device) for a period of time. Normal priority wireless devices can have blocked access because other wireless devices' transmissions may interfere with the node's reception of normal priority wireless devices' RACH, so the node cannot decode the transmission. EAB can be employed to block or bar a random access procedure from being performed on wireless devices configured for EAB, or EAB can be employed to block or bar a transmission on the RACH by wireless devices configured for EAB. As a result, EAB can reduce the overload on the RACH.

FIG. 1 illustrates an example of a plurality of wireless devices 320A-D, 322A-B, 324A-C, 326A-B, 330A-D, 332A-F, 334A-F, and 336A-D in a cell transmitting a RACH to a node 310 at a same time (or near the same time) generating a overload condition. The cell can be a logical definition generated by the transmitting station or geographic transmission area or sub-area covered by the transmitting station, which can include a specific cell identification (ID) that defines the parameters for the cell, such as control channels, reference signals, and component carriers (CC) frequencies. The wireless devices in the cell can include user devices 320A-D, 322A-B, 324A-C, and 326A-B and MTC or M2M devices 330A-D, 332A-F, 334A-F, and 336A-D. The wireless devices in the cell can include normal priority wireless devices (non-delay tolerant wireless devices) 320A-D and 330A-D and delay tolerant wireless devices 322A-B, 324A-C, 326A-B, 332A-F, 334A-F, and 336A-D. Although EAB can be well suited to MTC devices, EAB can be applied to other wireless devices (user devices) as well. Additionally, a MTC device can have normal priority access and may not be configured for EAB.

EAB can be used to limit the access of delay tolerant access devices, such as MTC wireless devices. In an example, delay tolerant access can be access that is subject to EAB. EAB can be applied at the wireless device and/or node and supported by the RAN and core network. The wireless device can become aware of a presence or a change in the EAB configuration information broadcast by the node by various procedures or methods. After the EAB configuration information is received, the wireless device can apply an access barring check process for EAB, which can also include processes for ACB.

Figure 2:
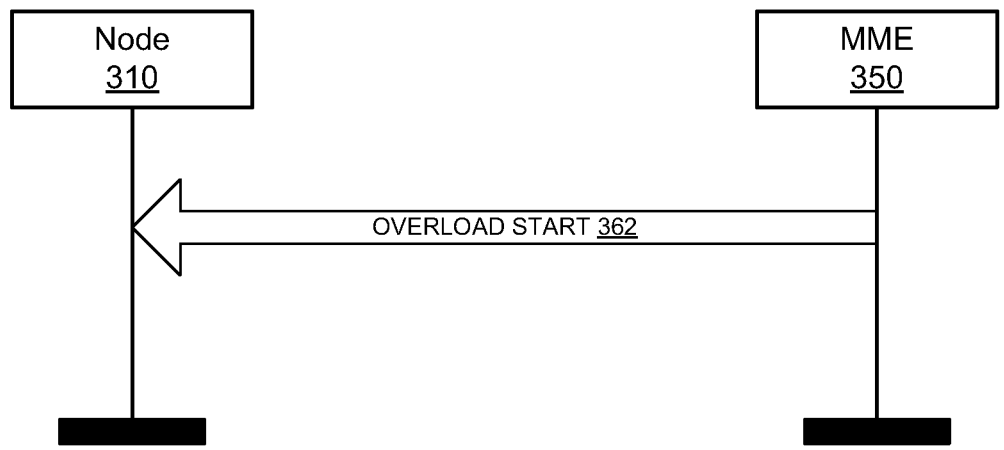
FIG. 2 illustrates a block diagram of an overload start process from a mobility management entity (MME) to a node in a long term evolution (LTE) system in accordance with an example.

The LTE system can provide an access barring overload mechanism for EAB between the node of the RAN and a mobility management entity (MME) of the core network (CN) via a S1 interface. FIG. 2 illustrates an OVERLOAD START 362 process from a MME 350 to a node 310 in a LTE system. The overload start process can inform the node to reduce the signaling load towards the concerned MME. The overload start process can use non-transmission associated signaling, such as S1 signaling. The node receiving the OVERLOAD START message can be informed that the MME is in overloaded state.

Figure 3:
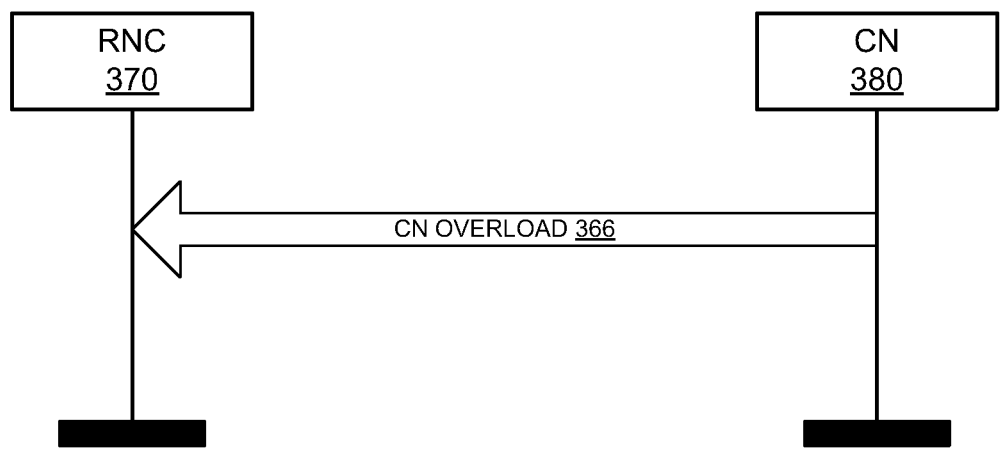
FIG. 3 illustrates a block diagram of an overload process from a core network (CN) to a radio network controller (RNC) in a universal mobile telecommunications system (UMTS) in accordance with an example.

The UMTS can provide an access barring overload mechanism for EAB between the node, including the RNC, of the RAN and the core network (CN) via an Iu-PS interface. An existing priority class indicator may be enhanced to carry EAB indication. Alternatively, a dedicated EAB indicator can be used to define EAB. FIG. 3 illustrates a CN OVERLOAD 366 process (or an OVERLOAD START message) at a CN 380 from a CN to a RNC 370 in a UMTS. The CN can indicate to the RNC that the CN is in a congested state by sending the CN OVERLOAD message.

Referring back to FIG. 2, when a core network (CN) entity (e.g., a MME 350) is overloaded, the CN entity can use an S1 application protocol (S1AP) OVERLOAD START 362 message to request the node 310 (e.g., eNB) to restrict a traffic load from subcategories (e.g., EAB categories) of wireless devices (e.g., UEs). The S1AP can provide the signaling service between E-UTRAN and the evolved packet core (EPC) and can have following functions: E-UTRAN radio access bearer (E-RAB) management function, initial context transfer function, UE capability information indication function, mobility functions, S1 interface management functions, non-access stratum (NAS) signaling transport function, S1 UE context release function, UE context modification function, status transfer, trace function, location reporting, S1 Code division multiple access 2000 (CDMA2000) tunneling function, warning message transmission function, RAN information management (RIM) function, and/or configuration transfer function.

In an example, EAB category information can be carried in an overload action information element (IE) in an overload response IE within the overload start message (e.g., OVERLOAD START message). However, since the overload action can be an abstract syntax notation one (ASN.1) enumerated type, the overload action may not allow the CN entity to request a reduction in the load from both delay tolerant wireless devices (e.g., UEs) and wireless devices configured for EAB in a same overload start message. Access barring may apply to delay tolerant wireless devices (or low access priority wireless devices), wireless devices configured for EAB, and/or multiple access priority wireless device (e.g., low priority, normal priority, and high priority wireless devices), which can be different types of wireless devices (in an example).

To allow greater flexibility to the categories of wireless devices barred or indicated in the overload response IE included in the overload start message, an EAB action IE (e.g., EAB Action IE) separate from the overload action IE can be used to allow both delay tolerant and EAB category information to be transferred in the same overload start message. In an example, the overload start message can be sent by the MME and can be used to indicate to the eNB that the MME is overloaded. The direction of the overload start message can be from the MME to the eNB.

The overload start message can include IE and/or group names with a mandatory (M) presence, such as message type IE, overload response IE, globally unique mobility management entity identifier (GUMMEI) list IE (which can include a GUMMEI list item, which can include a GUMMEI IE), and IE and/or group names with an optional (O) presence, such as a traffic load reduction indication IE and a EAB Action IE. The GUMMEI can include of a public land mobile network (PLMN) identity, a mobility management entity (MME) group identity, and an MME code. The EAB Action IE can have a "YES" criticality and assigned criticality "ignore".

In one embodiment, the EAB Action IE can indicate which signaling traffic is subject to EAB in an MME overload situation. The EAB Action IE can have an IE/group name (EAB Action), a presence, a range, an IE type and reference, and a semantics description. The presence for the EAB Action IE can include optional (O). The EAB Action IE can include an enumerated IE type with three categories, which can include apply EAB for UEs configured for EAB (i.e., category A), apply EAB for UEs configured for EAB and registered neither in their HPLMN nor in a PLMN that is equivalent to it (i.e., category B), or apply EAB for UEs configured for EAB and registered neither in the PLMN listed as most preferred PLMN of the country where the UE is roaming in the operator-defined PLMN selector list on the SIM/USIM, nor in their HPLMN nor in an PLMN that is equivalent to it (i.e., category C).

FIG. 4 illustrates an overload start message in a LTE system including an EAB action information element (IE). Names and labels of the EAB Action ASN.1 enumerated type can vary, but the names and labels can correspond to the following three EAB categories: Category A can include UEs configured for EAB, category B can include UEs configured for EAB and registered neither in their HPLMN nor in a PLMN that is equivalent to it, and category C can include UEs configured for EAB and registered neither in the PLMN listed as most preferred PLMN of the country where the UE is roaming in the operator-defined PLMN selector list on the SIM/USIM, nor in their HPLMN nor in an PLMN that is equivalent to it. The EAB action (and other described processes, indicators, and bit encoding) can provide an improvement for EAB handling, more flexibility for communicating EAB and low access priority separately, and allow future extensions for other purposes.

The overload start process can inform the node to reduce the signaling load towards the concerned MME. As shown in FIG. 2, the overload start process can use non-transmission associated signaling, such as S1 signaling. The node 310 receiving the OVERLOAD START 362 message can assume the MME is an overloaded state.

In an example, if the Overload Action IE in the Overload Response IE within the OVERLOAD START message is set to "reject radio resource control (RRC) connection establishments for non-emergency mobile originated data transfer" (i.e., reject traffic corresponding to RRC cause "mo-data" and "delayTolerantAccess"), or "reject RRC connection establishments for signaling" (i.e., reject traffic corresponding to RRC cause "mo-data", "mo-signalling" and "delayTolerantAccess"), or "permit RRC connection establishments for emergency sessions and mobile terminated services" (i.e., only permit traffic corresponding to RRC cause "emergency" and "mt-Access"), or "permit RRC connection establishments for high priority sessions and mobile terminated services" (i.e., only permit traffic corresponding to RRC cause "highPriorityAccess" and "mt-Access"), or "reject RRC connection establishment for delay tolerant access" (i.e., reject traffic corresponding to RRC cause "delayTolerantAccess")".

The node (e.g., eNB) can:
if the Traffic Load Reduction Indication IE is included in the OVERLOAD START message and if supported, reduce the signaling traffic indicated as to be rejected by the indicated percentage,
otherwise ensure that the signaling traffic not indicated as to be rejected is sent to the MME.

If the EAB Action IE within the OVERLOAD START message is set to
"Apply EAB for UEs configured for EAB", or
"Apply EAB UEs configured for EAB and registered neither in their HPLMN nor in a PLMN that is equivalent to it, or
"Apply EAB for UEs configured for EAB and registered neither in the PLMN listed as most preferred PLMN of the country where the UE is roaming in the operator-defined PLMN selector list on the SIM/USIM, nor in their HPLMN nor in an PLMN that is equivalent to it".

The node (e.g., eNB) can:
if the Traffic Load Reduction Indication IE is included in the OVERLOAD START message and if supported, reduce the signaling traffic indicated as to be rejected by the indicated percentage,
if the Traffic Load Reduction Indication IE is not included in the OVERLOAD START message and if supported, prevent the signaling traffic from indicated category by applying EAB,
otherwise ensure that the signaling traffic not indicated as to be rejected is sent to the MME.

When the Overload Action IE is set to "permit RRC connection establishments for emergency sessions and mobile terminated services", emergency calls with RRC cause "highPriorityAccess" from high priority users can be rejected. If the GUMMEI List IE is present, the node (e.g., eNB) can, if supported, use the information in the GUMMEI List IE to identify to which traffic of the above defined rejections may apply. If an overload action is ongoing and the node (e.g., eNB) receives a further OVERLOAD START message, the node can replace the ongoing overload action with the newly requested OVERLOAD START message.

In another configuration, an OverloadResponse IE can carry either OverloadAction or EABAction as illustrated by the following pseudo-code:

```
OverloadAction ::= ENUMERATED {
  reject-non-emergency-mo-dt,
  reject-rrc-cr-signalling,
  permit-emergency-sessions-and-mobile-terminated-services-only,
  ...,
  permit-high-priority-sessions-and-mobile-terminated-services-only,
  reject-delay-tolerant-access
}
EABAction ::== ENUMERATED {
  eab,
  eab-not-in-hplmn,
  eab-not-in-hplmn-not-in-country-preferred-plmn,
}
OverloadResponse ::= CHOICE {
  overloadAction          OverloadAction,
  eabAction               EABAction,
  ...
}
```

Where "eab" represents wireless devices that are configured for EAB (or category A), "eab-not-in-hplmn" represents wireless devices that are configured for EAB and are neither in the wireless device's HPLMN nor in a PLMN equivalent to the mobile's device's HPLMN (EHPLMN) (or category B), and "eab-not-in-hplmn-not-in-country-preferred-plmn" represents wireless devices that are configured for EAB and are neither in the PLMN listed as most preferred PLMN of the country where the mobile's device is roaming in an operator-defined PLMN selector list on the SIM/USIM, nor in the wireless device's HPLMN nor in a PLMN that is equivalent to the mobile's device's HPLMN (or category C).

As OverloadResponse can be of a CHOICE type, the OverloadResponse may not allow signaling of a legacy overload action and EAB action in the same overload start message.

In another configuration, the traffic load reduction indication IE carried in the overload start message from the CN entity (e.g., MME) to the node can be mapped to an access category (e.g., ac-BarringFactor IE) or an EAB barring category (e.g., eab-BarringCategory IE) used in a broadcast from the node to the wireless devices. If the traffic load reduction indication IE is present, the node (e.g., eNB) can reduce the signaling traffic by the indicated percentage. The traffic load reduction indication can be used to reject a certain percentage of RRC connections with the wireless devices (e.g., UEs).

The traffic load reduction indication IE can be used to bar a certain percentage of the wireless devices configured for EAB. In certain situations, the CN entity may not want to apply EAB to all the wireless devices of a certain category, but to a certain percentage of wireless devices in a category (e.g., category A, B, or C). To indicate the certain percentage of wireless devices in the category, the CN entity (e.g., MME) can send an overload start message with the EAB category (either in the overload action IE or in the EAB Action) and the traffic load reduction indication IE.

The traffic load reduction indication IE from the overload start message can be defined as an integer from 1 to 99. The traffic load reduction indication IE can be mapped to an RRC ac-BarringFactor IE from the AC-BarringConfig contained in the SystemInformationBlockType2 (SIB2) or a eab-BarringFactor IE from EAB configuration information in the SIB2 or another SIB.

In an example, the ac-BarringFactor or the eab-BarringFactor can be defined as an ASN.1 enumerated type having 10 values (e.g., p00, p05, p10, p15, p20, p25, p30, p40, p50, p60, p70, p75, p80, p85, p90, and p95). The traffic load reduction indication can be mapped linearly to the ac-BarringFactor or the eab-BarringFactor, so that, for instance, the value 20 indicated in the traffic load reduction indication can be used by the node to set the ac-BarringFactor or the eab-BarringFactor to p20 to reduce the traffic of the specified category to 20%.

The EAB configuration information can include a barring category (e.g., eab-BarringCategory or ac-BarringCategory) and/or barring factor (e.g., eab-BarringFactor or ac-BarringFactor) which can be broadcasted to the wireless devices via RRC signaling. The barring category can also be referred to as a roaming category. In an eab-BarringCategory example, the barring category can use a two-bit field to indicate which set or EAB category (roaming category) of wireless device can apply the EAB. For example, the '00' bit pattern can correspond to wireless devices that are configured for EAB (or category A). The '01' bit pattern can correspond wireless devices that are configured for EAB and are neither in the wireless device's HPLMN nor in a PLMN equivalent to the mobile's device's HPLMN (EHPLMN) (or category B). The '10' bit pattern can correspond wireless devices that are configured for EAB and are neither in the PLMN listed as most preferred PLMN of the country where the mobile's device is roaming in an operator-defined PLMN selector list on the SIM/USIM, nor in the wireless device's HPLMN nor in a PLMN that is equivalent to the mobile's device's HPLMN (or category C).

A public land mobile network (PLMN) can include a network established and operated by a regulatory body, an administration, or a recognized private operating agency (RPOA) for a specific purpose of providing land mobile communication services to the public. A relationship can exist between each subscriber and the subscriber's home PLMN (HPLMN). If communications are handled over another PLMN, the other PLMN can be referred to as a visited PLMN (VPLMN). A PLMN may provide service in one, or a combination, of frequency bands. A PLMN can be defined by borders of a country. More than one PLMN can exist in a country. The PLMN area can be the geographical area in which a PLMN provides communication services.

The barring factor can include a value on which access to a node by wireless device can be determined. For an eab-BarringFactor example, the wireless device may generate a random number. If the random number drawn by the wireless device is lower than the barring factor value, access to the node may be allowed. Otherwise access to the node can be barred. In another example, the values of the random number can be interpreted in the range [0,1] and the barring factor value can be a percentage, where p00 (0%)=0, p05 (5%)=0.05, p10 (10%)=0.10, . . . , p95 (95%)=0.95. For example, a p50 eab-BarringFactor indicates that approximately 50% of a category (A, B, or C) (as generated by each wireless device's random number generator) may be barred from accessing the node. Although a percentage incremented by 5% is illustrated, any percentage increment can be used.

The barring category used in the existing SIB or the dedicated SIB for EAB in LTE systems or UMTS can include a three-bit field or a two-bit field. In an example, the three EAB categories can be mutually exclusive, where wireless devices in category A are not in category B or category C, and wireless devices in category B are not in category A or category C, and wireless devices in category C are not in category A or category B.

In another example, each subcategory can be a superset of another category. For example, category A can be a superset of category B and category B can be a superset of category C, which can mean EAB applicable to category A wireless devices can apply to categories B and C wireless devices. Stated another way, category C can be a subset of category B and category B can be a subset of category A, which can mean EAB applicable to category B wireless devices can apply to categories C wireless devices, but may not apply to category A wireless devices.

Figure 5:
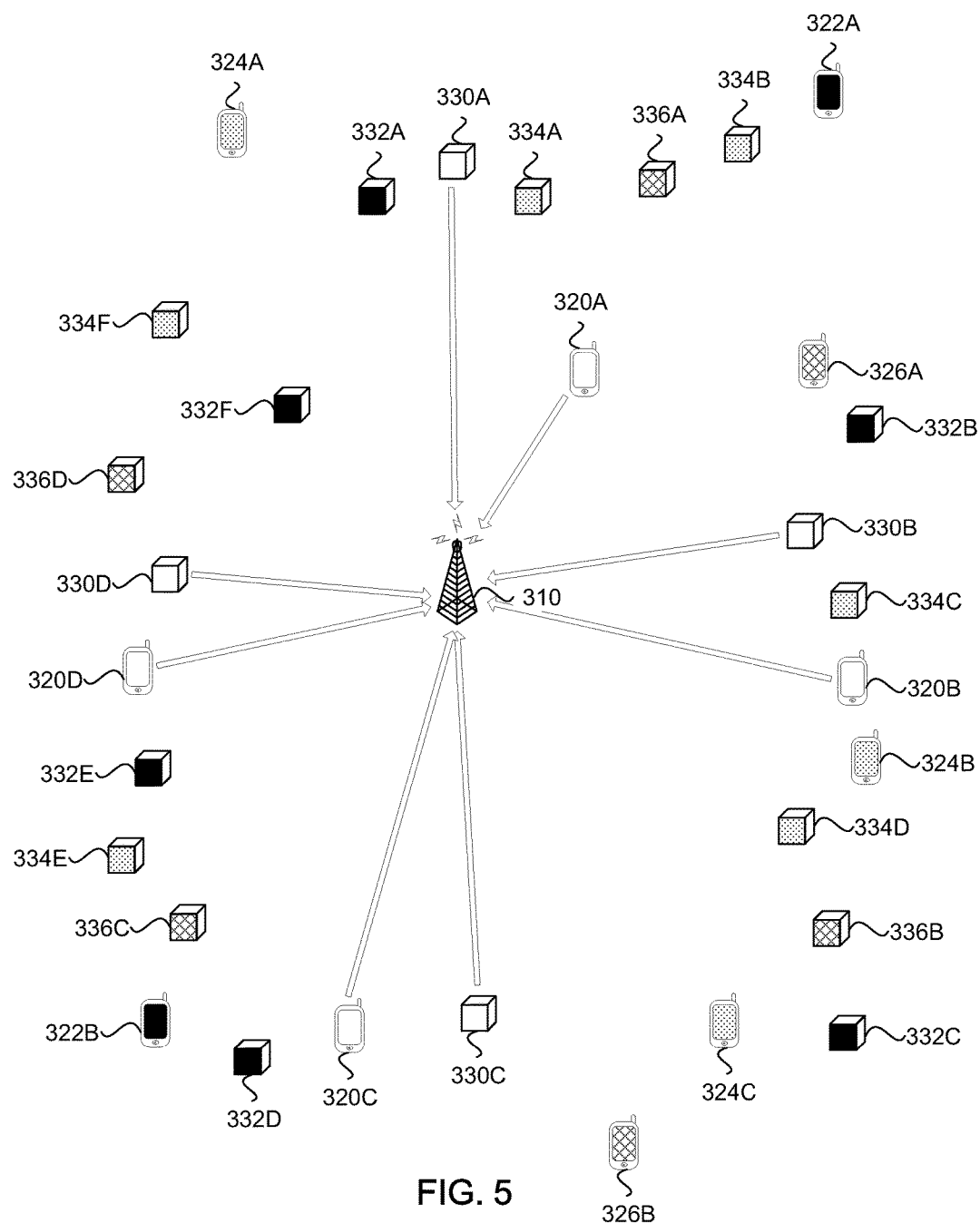
FIG. 5 illustrates a block diagram of a plurality of non-delay tolerant mobiles devices transmitting a random access channel (RACH) to a node and EAB category A wireless devices barred from transmitting to the node in accordance with an example.

FIG. 5 illustrates an example of EAB applied to category A wireless devices 322A-B, 324A-C, 326A-B, 332A-F, 334A-F, and 336A-D with a barring factor value of 100% allowing other wireless devices (or normal priority wireless devices) 320A-D and 330A-D in a cell to transmit a RACH to (and subsequently communicate with) the node 310 without the category A wireless devices accessing the node. In an example, the category A wireless devices can include 322A-B, 324A-C, 326A-B, 332A-F, 334A-F, and 336A-D. The category B wireless devices can include 322A-B, 326A-B, 332A-F, and 336A-D. The category C wireless devices can include 322A-B and 332A-F.

Figure 6:
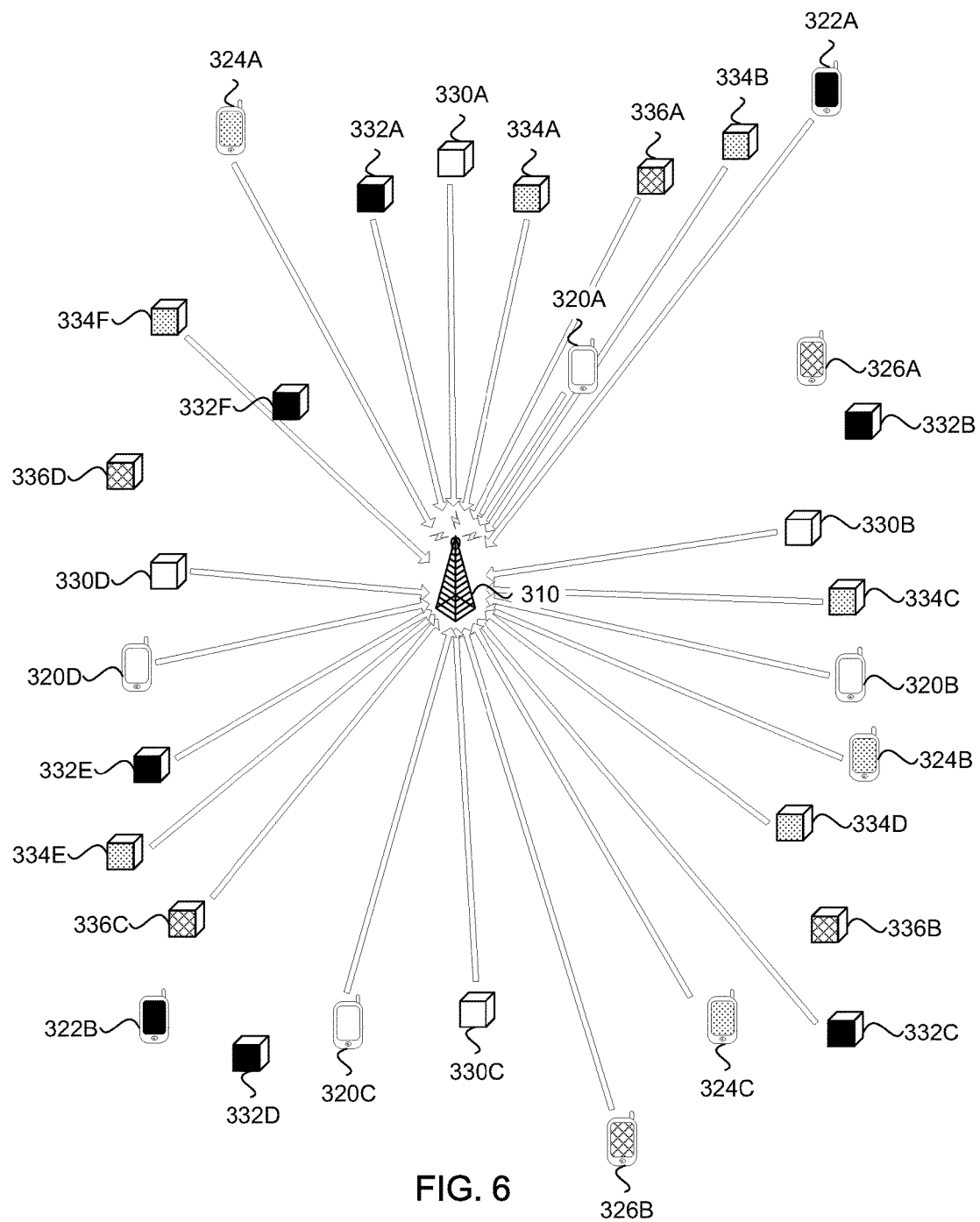
FIG. 6 illustrates a block diagram of a plurality of non-EAB category B mobiles devices transmitting a random access channel (RACH) to a node and some EAB category B wireless devices barred from transmitting to the node in accordance with an example.

FIG. 6 illustrates an example of EAB applied to category B wireless devices 322A-B, 326A-B, 332A-F, and 336A-D with a barring factor value of 50%. Category A wireless devices (excluding category B wireless devices) 324A-C and 334A-F and other wireless devices (or normal priority wireless devices) 320A-D and 330A-D can transmit to the node 310. Fifty percent (50%) of the category B wireless devices 322B, 326A, 332B, 332D, 332F, 336B, and 336D can be barred allowing another 50% of the category B wireless devices 322A, 326B, 332A, 332C, 332E, 336A, and 336C to transmit to the node.

In the specific examples shown previously, parameters, such as the barring category (e.g., eab-BarringCategory) and barring factor (e.g., eabBarringFactor) can be configured to control the percentage of wireless devices within a barring category that can be barred. The barring factor can include a percentage of wireless devices in a barring category or a maximum number of access attempts of wireless devices in the barring category.

In an example for UMTS, the CN entity 380 can include a serving general packet radio services (GPRS) support node (SGSN), the node can include a RNC 370, and the CN entity can use RNC signaling, as shown in FIG. 3. Similarly to LTE, in UMTS the CN network can request the RNC to restrict the load from subcategories of wireless device (e.g., UEs). In UMTS, a radio access network application part (RANAP) protocol OVERLOAD message (e.g., CN OVERLOAD 366 message) can be used by the CN entity to indicate to the RNC that the core network is overload. A priority class indicator IE can be used to carry an EAB category or an EAB indicator IE can be used to carry the EAB category. The EAB category (in the priority class indicator IE or the EAB indicator IE) can be encoded using three bits, where each bit indicates the EAB category (e.g., category A, B, or C), or the EAB category can be encoded using two bits.

Since different EAB categories can be subsets of each other, the EAB categories can be encoded using two bits. The priority class indicator IE or EAB indicator IE can use optimized two bit encoding, which can exploit that one EAB category may be signaled at a time. One unique two-bit combination can be used to signal one EAB category. For example, the '00' bit combination can limit traffic from wireless devices (e.g., UEs) configured for EAB (or category A). The '10' bit combination can limit traffic from UEs configured for EAB and registered neither in their HPLMN nor in a PLMN that is equivalent to it (or category B). The '01' bit combination can limit traffic from UEs configured for EAB and registered neither in the PLMN listed as most preferred PLMN of the country where the UE is roaming in the operator-defined PLMN selector list on the SIM/USIM, nor in their HPLMN nor in an PLMN that is equivalent to it (or category C). Other bit combinations can be used to represent the categories. For example, '00' can correspond to category A wireless devices, '01' can correspond to category B wireless devices, and '10' can correspond to category C wireless devices.

The described processes, procedures, and signaling mechanisms to configure EAB for the LTE and UMTS network can efficiently bar the access of certain categories of wireless devices for overload protection and control.

Figure 7:
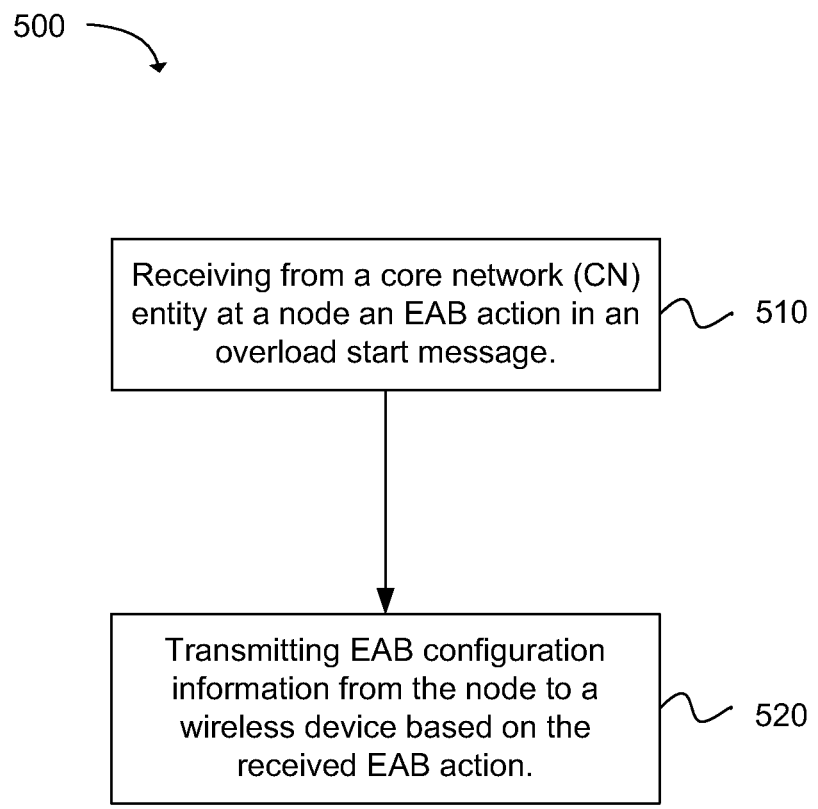
FIG. 7 depicts a flow chart of a method for core network signaling of an extended access barring (EAB) action to a node in accordance with an example.

Another example provides a method 500 for core network signaling of an extended access barring (EAB) action to a node, as shown in the flow chart in FIG. 7. The method may be executed as instructions on a machine, where the instructions are included on at least one computer readable medium or one non-transitory machine readable storage medium. The method includes the operation of receiving from a core network (CN) entity at a node an EAB action in an overload start message, as in block 510. The operation of transmitting EAB configuration information from the node to a wireless device based on the received EAB action follows, as in block 520.

The EAB action can include a barring category that represents categories of wireless devices, where a first category represents wireless devices configured for EAB, a second category represents wireless devices configured for EAB not in wireless device's home public land mobile network (HPLMN) or a public land mobile network (PLMN) equivalent to the wireless device's HPLMN, and a third category represents wireless devices configured for EAB not in a preferred PLMN, wireless device's HPLMN, or the PLMN equivalent to wireless device's HPLMN. The barring category can be an abstract syntax notation one (ASN.1) enumerated type.

In an example, the EAB action can be included in an EAB action information element (IE) that is a separate IE from an overload action IE. The EAB action IE can be included in an overload response IE. In another example, the EAB action can be included in an overload response IE, and the overload response IE can include a choice type of either the EAB action or an overload action.

The method can further include the node receiving from the core network entity a traffic load indication IE in the overload start message. The traffic load indication IE can define an EAB percentage of wireless devices applying a barring category in the EAB action. The node can map the EAB percentage to an access class (AC) barring factor IE in an AC barring configuration in a system information block (SIB). The node can transmit the AC barring factor IE from the node to the wireless device via radio resource control (RRC) signaling.

In another example, the core network entity can include a serving general packet radio services (GPRS) support node (SGSN) in a universal mobile telecommunications system (UMTS). The node can include a radio network controller (RNC). The EAB action can be included in a priority class indicator IE or an EAB indicator IE. The overload start message can include a radio access network application part (RANAP) overload message. The EAB action can include a barring category using two bit encoding.

Figure 8:
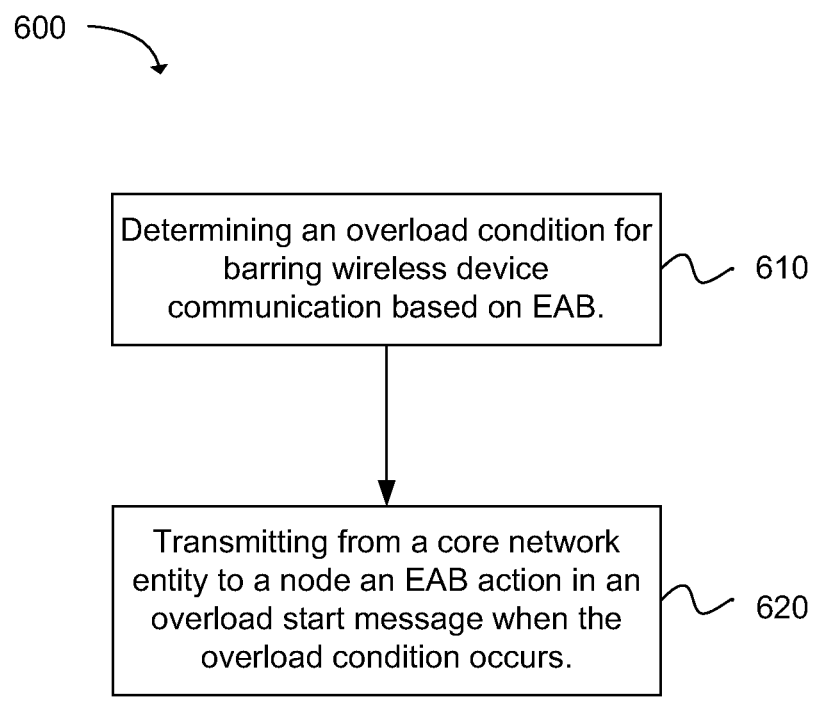
FIG. 8 depicts a flow chart of a method for core network signaling of an extended access barring (EAB) action from a core network (CN) entity in accordance with an example.

Another example provides a method 600 for core network signaling of an extended access barring (EAB) action from a core network (CN) entity, as shown in the flow chart in FIG. 8. The method may be executed as instructions on a machine, where the instructions are included on at least one computer readable medium or one non-transitory machine readable storage medium. The method includes the operation of determining an overload condition for barring wireless device communication based on EAB, as in block 610. The operation of transmitting from a core network entity to a node an EAB action in an overload start message when the overload condition occurs follows, as in block 620.

The EAB action can include a barring category that represents categories of wireless devices, where a first category represents wireless devices configured for EAB, a second category represents wireless devices configured for EAB not in wireless device's home public land mobile network (HPLMN) or a public land mobile network (PLMN) equivalent to the wireless device's HPLMN, and a third category represents wireless devices configured for EAB not in a preferred PLMN, wireless device's HPLMN, or the PLMN equivalent to wireless device's HPLMN. The barring category can be an abstract syntax notation one (ASN.1) enumerated type.

In an example, the EAB action can be included in an EAB action information element (IE) that is a separate IE from an overload action IE. The EAB action IE can be included in an overload response IE. In another example, the EAB action can be included in an overload response IE, and the overload response IE can include a choice type of either the EAB action or an overload action.

The method can further include the core network entity transmitting to the node a traffic load indication IE in the overload start message. The traffic load indication IE can define an EAB percentage of wireless devices applying a barring category in the EAB action. The EAB percentage can correspond to an access class (AC) barring factor IE in an AC barring configuration in a system information block (SIB) sent to a wireless device via radio resource control (RRC) signaling.

In another example, the core network entity can include a serving general packet radio services (GPRS) support node (SGSN) in a universal mobile telecommunications system (UMTS). The node can include a radio network controller (RNC). The EAB action can be included in a priority class indicator IE or an EAB indicator IE. The overload start message can include a radio access network application part (RANAP) overload message. The EAB action can include a barring category using two bit encoding.

Figure 9:
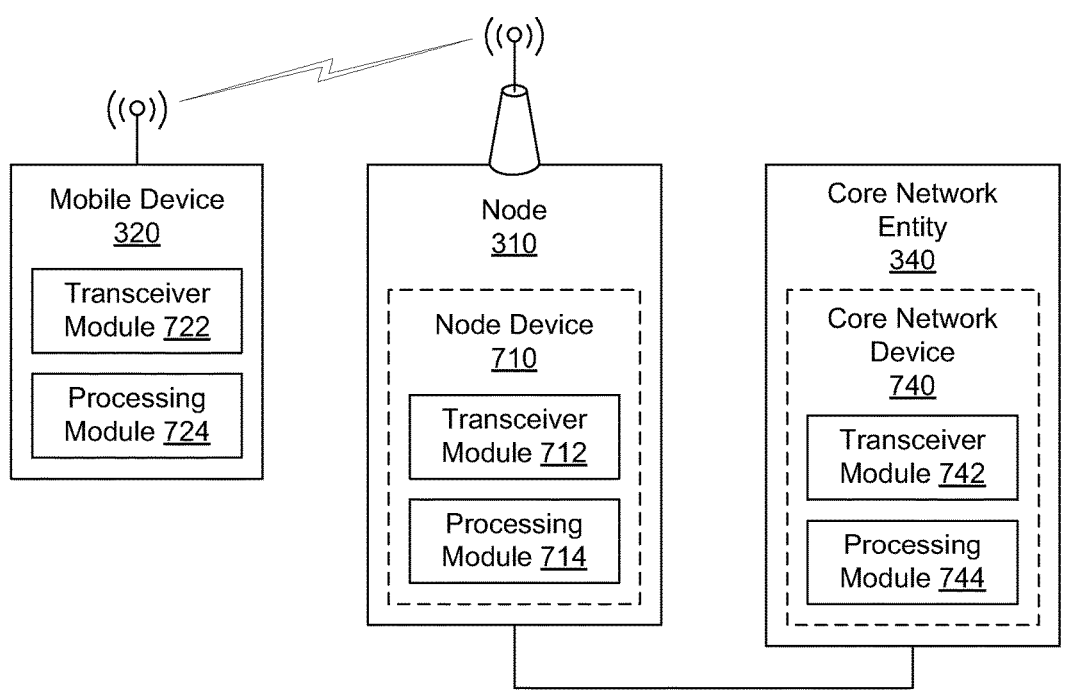
FIG. 9 illustrates a block diagram of a wireless device, a node, and a core network (CN) entity in accordance with an example.

FIG. 9 illustrates an example core network entity 340 configured to communicate via a wired or optical link with an example node 310, and the node is configured to communicate via a wireless protocol with an example wireless device 320 configured for extended access barring. The core network entity includes a mobility management entity (MME) in a long term evolution (LTE) system or a serving general packet radio services (GPRS) support node (SGSN) in a universal mobile telecommunications system (UMTS). The node device is included in a node, wherein the node includes an evolved Node B (eNB) or a Node B (macro-NB) in the LTE system or a radio network controller (RNC) in the UMTS.

The node 310 can include a node device 710. The node device can include a transceiver module 712 and a processing module 714. The transceiver module of the node device can be configured to receive from a core network (CN) entity an EAB action in an overload start message and can be configured to communicate EAB configuration information with an EAB barring category to a wireless device based on the received EAB action. The EAB action can include a wireless device's roaming category to apply EAB. The transceiver module can be further configured to receive from the core network entity a traffic load indication IE in the overload start message, where the traffic load indication IE defines an EAB percentage of wireless devices applying a barring category in the EAB action. The processing module of the node device can be configured to map the EAB percentage to an access class (AC) barring factor IE in an AC barring configuration in a system information block (SIB). The transceiver module can be further configured to transmit the AC barring factor IE to the wireless device via radio resource control (RRC) signaling. In addition, the transceiver module and the processing module of the node device can be configured to provide the functionality for EAB related to the node as previously described.

The core network entity 340 can include a core network device 740. The core network device can include a transceiver module 742 and a processing module 744. The processing module of the core network device can be configured to determine an overload condition for barring wireless device communication based on EAB. The transceiver module of the core network device can be configured to a node an EAB action with an EAB barring category in an overload start message when the overload condition occurs. The transceiver module can be further configured to transmit to the node a traffic load indication IE in the overload start message. The traffic load indication IE can define an EAB percentage of wireless devices applying a barring category in the EAB action. The EAB percentage can correspond to an access class (AC) barring factor IE in an AC barring configuration in a system information block (SIB) sent to a wireless device via radio resource control (RRC) signaling. In addition, the transceiver module and the processing module of the core network device can be configured to provide the functionality for EAB related to the node as previously described.

The wireless device 320 can include a processing module 724 and a transceiver module 722. The transceiver module of the wireless device can receive EAB configuration information from the node 310. The processing module of the wireless device can bar transmissions to the node for the wireless device having characteristics identified in the EAB configuration information for barring. In addition, the transceiver module and the processing module of the wireless device can be configured to provide the functionality for EAB related to the wireless device as previously described.

Figure 10:
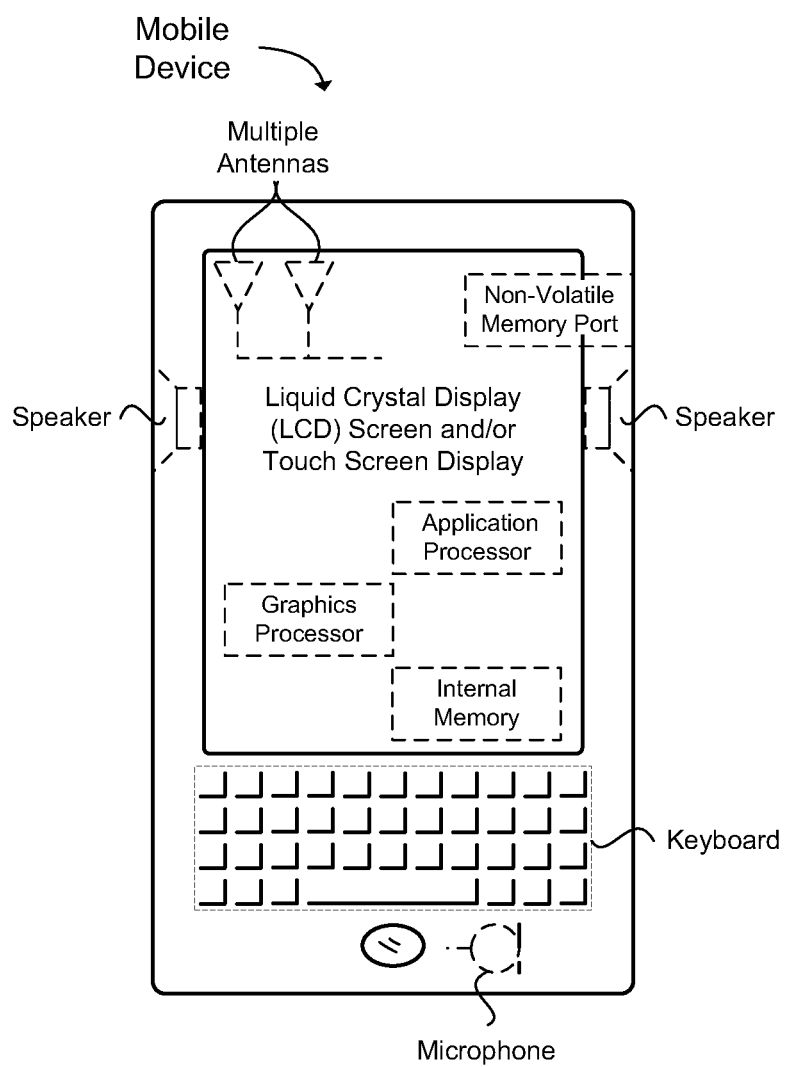
FIG. 10 illustrates a diagram of a wireless device in accordance with an example.

In another example, a node can be in wireless communication with a wireless device. FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with node, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, 3GPP UMTS, GSM, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. At least one non-transitory machine readable storage medium comprising a plurality of instructions executed to implement a method for core network signaling of an extended access barring (EAB) action to a node, comprising:
   receiving from a core network (CN) entity at a node an EAB action in an overload start message, wherein the core network entity includes a serving general packet radio services (GPRS) support node (SGSN) in a universal mobile telecommunications system (UMTS), the node includes a radio network controller (RNC), the EAB action is included in a priority class indicator IE or an EAB indicator IE, the overload start message includes a radio access network application part (RANAP) overload message, and the EAB action includes a barring category using two bit encoding;
   receiving from the core network entity at the node a traffic load indication IE in the overload start message, wherein the traffic load indication IE defines an EAB percentage of wireless devices applying a barring category in the EAB action;
   transmitting EAB configuration information from the node to a wireless device based on the received EAB action;
   mapping the EAB percentage to an access class (AC) barring factor IE in an AC barring configuration in a system information block (SIB); and
   transmitting the AC barring factor IE from the node to the wireless device via radio resource control (RRC) signaling.

2. The machine readable storage medium of claim 1, wherein the EAB action includes a barring category that represents categories of wireless devices, where a first category represents wireless devices configured for EAB, a second category represents wireless devices configured for EAB not in wireless device's home public land mobile network (HPLMN) or a public land mobile network (PLMN) equivalent to the wireless device's HPLMN, and a third category represents wireless devices configured for EAB not in a preferred PLMN, wireless device's HPLMN, or the PLMN equivalent to wireless device's HPLMN.

3. The machine readable storage medium of claim 2, wherein the barring category is an abstract syntax notation one (ASN.1) enumerated type.

4. The machine readable storage medium of claim 1, wherein the EAB action includes a wireless device's roaming category to apply EAB.

5. The machine readable storage medium of claim 1, wherein the core network entity includes a mobility management entity (MME) in a long term evolution (LTE) system or a serving general packet radio services (GPRS) support node (SGSN) in a universal mobile telecommunications system (UMTS), and the node includes an evolved Node B (eNB) or a Node B (macro-NB) in the LTE system or a radio network controller (RNC) in the UMTS.

6. The machine readable storage medium of claim 1, wherein the EAB action is included in an EAB action information element (IE) that is a separate IE from an overload action IE, and the EAB action IE is included in an overload response IE.

7. The machine readable storage medium of claim 1, wherein the EAB action is included in an overload response IE, and the overload response IE can include a choice type of either the EAB action or an overload action.

8. A node device configured for extended access barring (EAB) core network signaling, comprising:
a transceiver module configured to receive from a core network (CN) entity an EAB action in an overload start message, wherein the core network entity includes a serving general packet radio services (GPRS) support node (SGSN) in a universal mobile telecommunications system (UMTS), the node device is included in a radio network controller (RNC), the EAB action is included in a priority class indicator IE or an EAB indicator IE, the overload start message includes a radio access network application part (RANAP) overload message, and the EAB action includes a barring category using two bit encoding,
wherein the transceiver module is further configured to:
communicate EAB configuration information with an EAB barring category to a wireless device based on the received EAB action, and the EAB action includes the barring category that represents categories of wireless devices, where a first category represents wireless devices configured for EAB, a second category represents wireless devices configured for EAB not in wireless device's home public land mobile network (HPLMN) or a public land mobile network (PLMN) equivalent to the wireless device's HPLMN, and a third category represents wireless devices configured for EAB not in a preferred PLMN, wireless device's HPLMN, or the PLMN equivalent to wireless device's HPLMN; and
receive from the core network entity a traffic load indication IE in the overload start message, wherein the traffic load indication IE defines an EAB percentage of wireless devices applying a barring category in the EAB action, and further comprising:
a processing module configured to map the EAB percentage to an access class (AC) barring factor IE in an AC barring configuration in a system information block (SIB), and
wherein the transceiver module is further configured to transmit the AC barring factor IE to the wireless device via radio resource control (RRC) signaling.

9. The node device of claim 8, wherein the core network entity includes a mobility management entity (MME) in a long term evolution (LTE) system or a serving general packet radio services (GPRS) support node (SGSN) in a universal mobile telecommunications system (UMTS), and the node device is included in a node, wherein the node includes an evolved Node B (eNB) or a Node B (macro-NB) in the LTE system or a radio network controller (RNC) in the UMTS.

10. The node device of claim 8, wherein the EAB action is included in an EAB action information element (IE) that is a separate IE from an overload action IE, and the EAB action IE is included in an overload response IE.

11. The node device of claim 8, wherein the EAB action is included in an overload response IE, and the overload response IE can include a choice type of either the EAB action or an overload action.

12. A core network device configured for extended access barring (EAB) core network signaling, comprising:
a processing module configured to determine an overload condition for barring wireless device communication based on EAB; and
a transceiver module configured to transmit to a node an EAB action with an EAB barring category in an overload start message when the overload condition occurs, wherein the core network device is included in a core network entity, and the core network entity includes a serving general packet radio services (GPRS) support node (SGSN) in a universal mobile telecommunications system (UMTS), the node includes in a radio network controller (RNC), the EAB action is included in a priority class indicator IE or an EAB indicator IE, the overload start message includes a radio access network application part (RANAP) overload message, and the EAB action includes a barring category using two bit encoding,
wherein the transceiver module is further configured to transmit to the node a traffic load indication IE in the overload start message, wherein the traffic load indication IE defines an EAB percentage of wireless devices applying a barring category in the EAB action, wherein the EAB percentage corresponds to an access class (AC) barring factor IE in an AC barring configuration in a system information block (SIB) sent to a wireless device via radio resource control (RRC) signaling, and
wherein the EAB action includes a wireless device's roaming category to apply EAB.

13. The core network device of claim 12, wherein the EAB action includes the barring category that represents categories of wireless devices, where a first category represents wireless devices configured for EAB, a second category represents wireless devices configured for EAB not in wireless device's home public land mobile network (HPLMN) or a public land mobile network (PLMN) equivalent to the wireless device's HPLMN, and a third category represents wireless devices configured for EAB not in a preferred PLMN, wireless device's HPLMN, or the PLMN equivalent to wireless device's HPLMN.

14. The core network device of claim 12, wherein the core network device is included in a core network entity, and the core network entity includes a mobility management entity (MME) in a long term evolution (LTE) system or a serving general packet radio services (GPRS) support node (SGSN) in a universal mobile telecommunications system (UMTS), and the node includes an evolved Node B (eNB) or a Node B (macro-NB) in the LTE system or a radio network controller (RNC) in the UMTS.

15. The core network device of claim 12, wherein the EAB action is included in an EAB action information element (IE) that is a separate IE from an overload action IE, and the EAB action IE is included in an overload response IE.

16. The core network device of claim 12, wherein the EAB action is included in an overload response IE, and the overload response IE can include a choice type of either the EAB action or an overload action.

17. A method for core network signaling of an extended access barring (EAB) action from a core network (CN) entity, comprising:
determining an overload condition for barring wireless device communication based on EAB;
transmitting from a core network entity to a node an EAB action in an overload start message when the overload condition occurs, wherein the core network entity includes a serving general packet radio services (GPRS) support node (SGSN) in a universal mobile telecommunications system (UMTS), the node includes a radio network controller (RNC), the EAB action is included in a priority class indicator IE or an EAB indicator IE, the overload start message includes a radio access network application part (RANAP) overload message, and the EAB action includes a barring category using two bit encoding; and transmitting from the core network entity to the node a traffic load indication IE in the overload start message, wherein the traffic load indication IE defines an EAB percentage of wireless devices applying a barring category in the EAB action, wherein the EAB percentage corresponds to an access class (AC) barring factor IE in an AC barring configuration in a system information block (SIB) sent to a wireless device via radio resource control (RRC) signaling.

18. The method of claim 17, wherein the EAB action includes a barring category that represents categories of wireless devices, where a first category represents wireless devices configured for EAB, a second category represents wireless devices configured for EAB not in wireless device's home public land mobile network (HPLMN) or a public land mobile network (PLMN) equivalent to the wireless device's HPLMN, and a third category represents wireless devices configured for EAB not in a preferred PLMN, wireless device's HPLMN, or the PLMN equivalent to wireless device's HPLMN.

19. The method of claim 17, wherein the EAB action is included in an EAB action information element (IE) that is a separate IE from an overload action IE, and the EAB action IE is included in an overload response IE.

20. The method of claim 17, wherein the EAB action is included in an overload response IE, and the overload response IE can include a choice type of either the EAB action or an overload action.

21. The method of claim 17, wherein the core network entity includes a mobility management entity (MME) in a long term evolution (LTE) system or a serving general packet radio services (GPRS) support node (SGSN) in a universal mobile telecommunications system (UMTS), and the node includes an evolved Node B (eNB) or a Node B (macro-NB) in the LTE system or a radio network controller (RNC) in the UMTS.

22. At least one non-transitory machine readable storage medium comprising a plurality of instructions executed to implement the method of claim 17.

23. At least one non-transitory machine readable storage medium comprising a plurality of instructions executed to implement a method for core network signaling of an extended access barring (EAB) action to a node, comprising:

receiving from a core network (CN) entity at a node an EAB action in an overload start message, the EAB action is included in a priority class indicator IE or an EAB indicator IE;

receiving from the core network entity at the node a traffic load indication IE in the overload start message, wherein the traffic load indication IE defines an EAB percentage of wireless devices applying a barring category in the EAB action;

transmitting EAB configuration information from the node to a wireless device based on the received EAB action;

mapping the EAB percentage to an access class (AC) barring factor IE in an AC barring configuration in a system information block (SIB); and transmitting the AC barring factor IE from the node to the wireless device via radio resource control (RRC) signaling.

* * * * *